United States Patent [19]

Decker

[11] 4,371,743

[45] Feb. 1, 1983

[54] HINGED PULL-DOWN FUSE BLOCK ASSEMBLY

[75] Inventor: Earl L. Decker, Youngstown, Ohio

[73] Assignee: General Motors Corporation, Detroit, Mich.

[21] Appl. No.: 248,578

[22] Filed: Mar. 27, 1981

[51] Int. Cl.[3] .............................................. B60K 37/00

[52] U.S. Cl. .................................. 174/52 R; 248/293; 312/274; 312/326; 337/214; 180/90; 296/70

[58] Field of Search ............... 174/48, 52 R; 337/194, 337/195, 196, 208, 212, 207, 214; 339/10, 34; 248/324, 293; 312/242, 248, 322, 326, 274; 296/70; 180/90; 361/430

[56] References Cited

U.S. PATENT DOCUMENTS

| | | | |
|---|---|---|---|
| 2,616,945 | 11/1952 | White . | |
| 3,390,309 | 6/1968 | McGrew, Jr. . | |
| 3,464,749 | 9/1969 | Bishop | 312/242 X |
| 3,639,882 | 2/1972 | Honda et al. . | |

FOREIGN PATENT DOCUMENTS

| | | |
|---|---|---|
| 7311644 | 7/1973 | Fed. Rep. of Germany . |

*Primary Examiner*—A. T. Grimley
*Assistant Examiner*—D. A. Tone
*Attorney, Agent, or Firm*—F. J. Fodale

[57] ABSTRACT

A fuse block assembly for an automotive vehicle comprises a bracket attached behind the front wall of the vehicle instrument panel, a fuse block hinged to the bracket for movement about a horizontal axis between a generally horizontal position where the fuse block is stored behind the instrument panel and a generally vertical position where the fuse block hangs below the instrument panel for easy access to replace the fuses and the like carried by the fuse block and a manually releasable latch at the opposite end of the fuse block which engages the bracket to hold the fuse block in the stored position.

5 Claims, 16 Drawing Figures

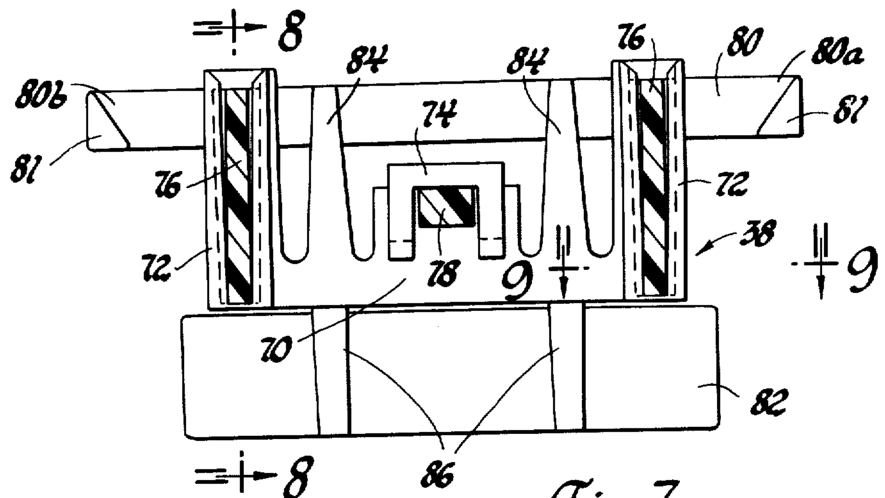
Fig. 7
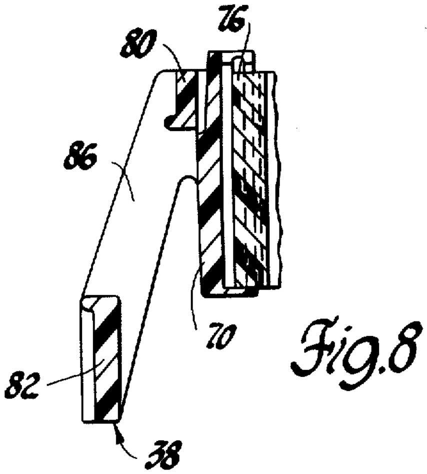
Fig. 8
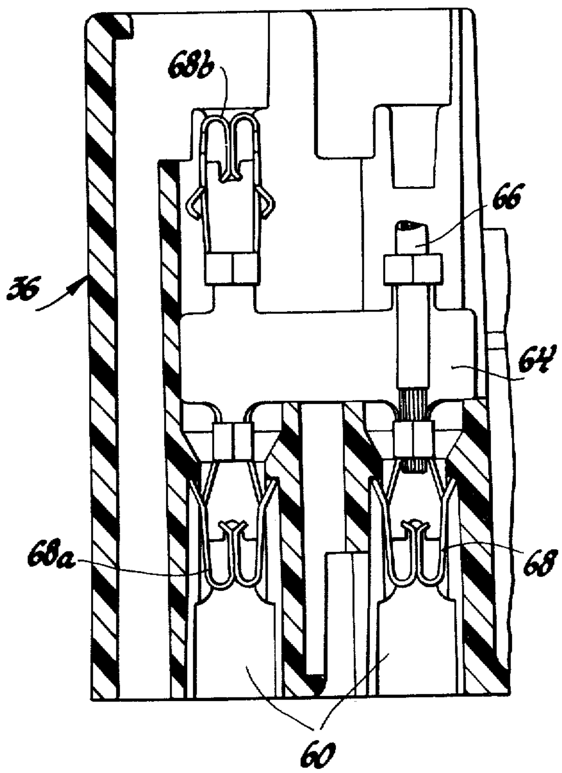
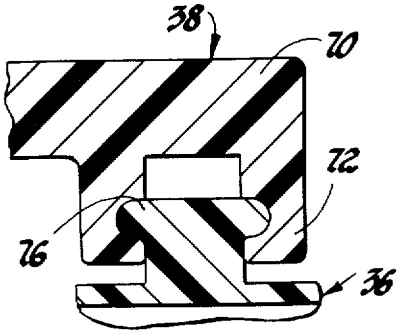
Fig. 9
Fig. 10

HINGED PULL-DOWN FUSE BLOCK ASSEMBLY

This invention relates generally to fuse blocks and, more particularly, to fuse blocks for automotive passenger vehicles.

Automotive fuse blocks are usually mounted underneath the instrument panel on the fire wall which separates the passenger compartment from the engine compartment. The fuse block is usually located between the steering column and the door on the driver's side of the automobile. This out-of-the-way location is advantageous in that the fuse block does not interfere with driver comfort in any way. However, the location is not very convenient for installing or replacing fuses or other electrical components which are plugged into the fuse block.

The object of this invention is to provide a fuse block assembly for mounting in an automotive passenger vehicle and the like, so that the fuse block is normally stored in an out-of-the-way location for driver comfort and moveable to a very accessible position for installing or replacing fuses or other plug-in components.

More specifically, the object of my invention is to provide a fuse block assembly having a hinged fuse block which is latched in a stored out-of-the-way position when the assembly is mounted behind the instrument panel and which is then easily unlatched and pulled-down to a very accessible position.

Other objects and features of the invention will become apparent to those skilled in the art as the disclosure is made in the following detailed description of a preferred embodiment of the invention as illustrated in the accompanying sheets of drawing in which:

FIG. 7 is a section taken substantially along the line 7—7 of FIG. 5.

FIG. 8 is a section taken substantially along the line 8—8 of FIG. 7.

FIG. 9 is a section taken substantially along the line 9—9 of FIG. 7.

FIG. 10 is a section taken substantially along the line 10—10 of FIG. 3.

Figure 1:
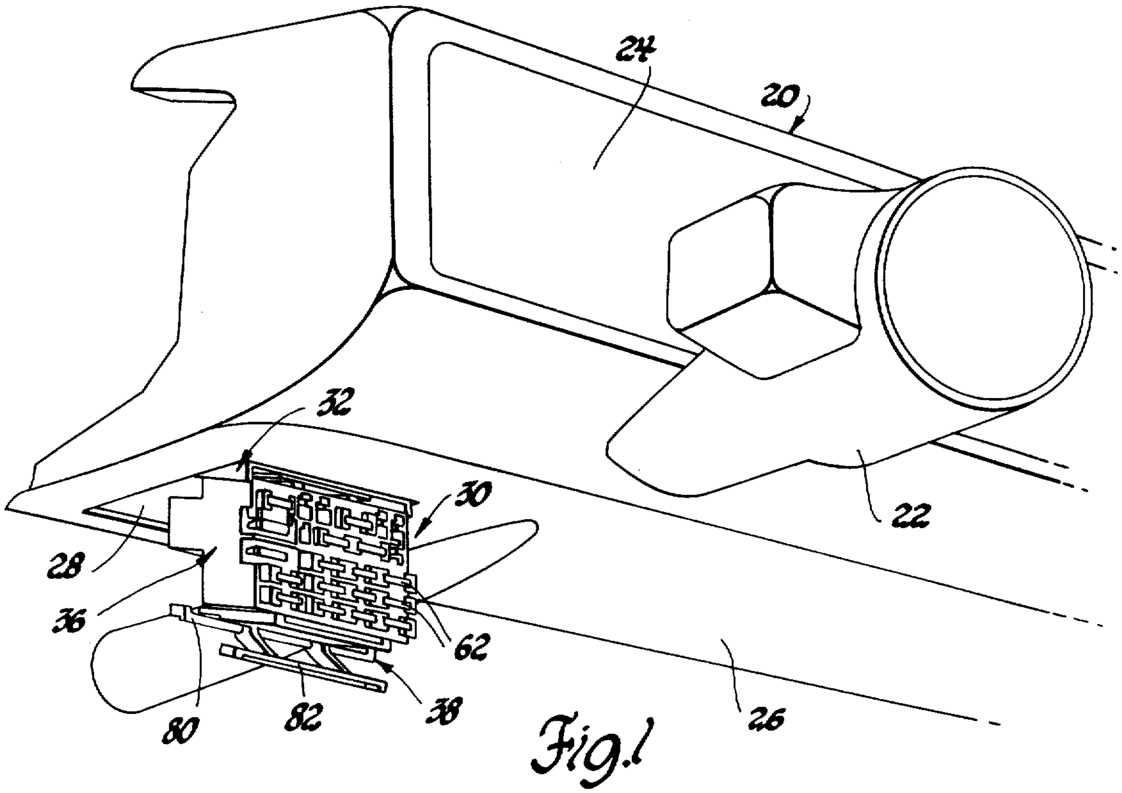
FIG. 1 is a perspective view of an automotive instrument panel equipped with a hinged pull-down fuse block assembly in accordance with this invention.
Figure 2:
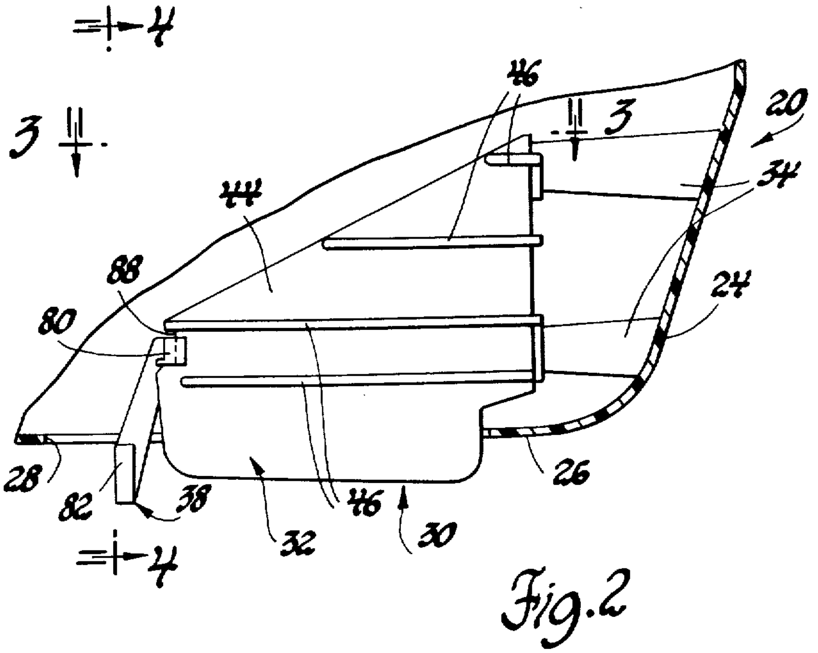
FIG. 2 is a vertical section through the instrument panel of FIG. 1 illustrating the fuse block assembly in another operative position.

Referring now to the drawing, FIGS. 1 and 2 illustrate an automotive instrument panel 20, particularly the portion which faces the driver as indicated by the steering column 22.

The instrument panel 20 generally projects toward the upper body of the seated driver. It has a generally vertical front wall 24 and a generally horizontal bottom wall 26 which is spaced from the vehicle floor to allow leg room for the driver.

The instrument panel 20 has a rectangular hole 28 in the bottom wall 26 which is just to the left of the steering column 22. A fuse block assembly 30 is mounted behind the front wall 24 of the instrument panel 20 over the rectangular hole 28.

The fuse block assembly 30 includes a bracket or frame 32 which is secured to mounting pedestals 34 integral with the front wall 24. The fuse block assembly 30 also includes a fuse block 36 which is hinged to the bracket 32 so that the fuse block 36 is moveable between a generally horizontal stored position shown in FIG. 2 and a generally vertical access position shown in FIG. 1.

The fuse block assembly 30 is shown in detail in FIGS. 3 through 10.

The fuse block assembly 30 comprises three components, the bracket or frame 32; the fuse block 36; and a latch 38 which engages the bracket 32 to hold the fuse block 36 in the stored position.

The bracket 32 is U-shaped in plan form having a front wall 40, and two side walls 42 and 44. The bracket 32 is strengthened and stiffened by a number of generally horizontal internal and external ribs 46 on the walls 40, 42 and 44.

Figure 5:
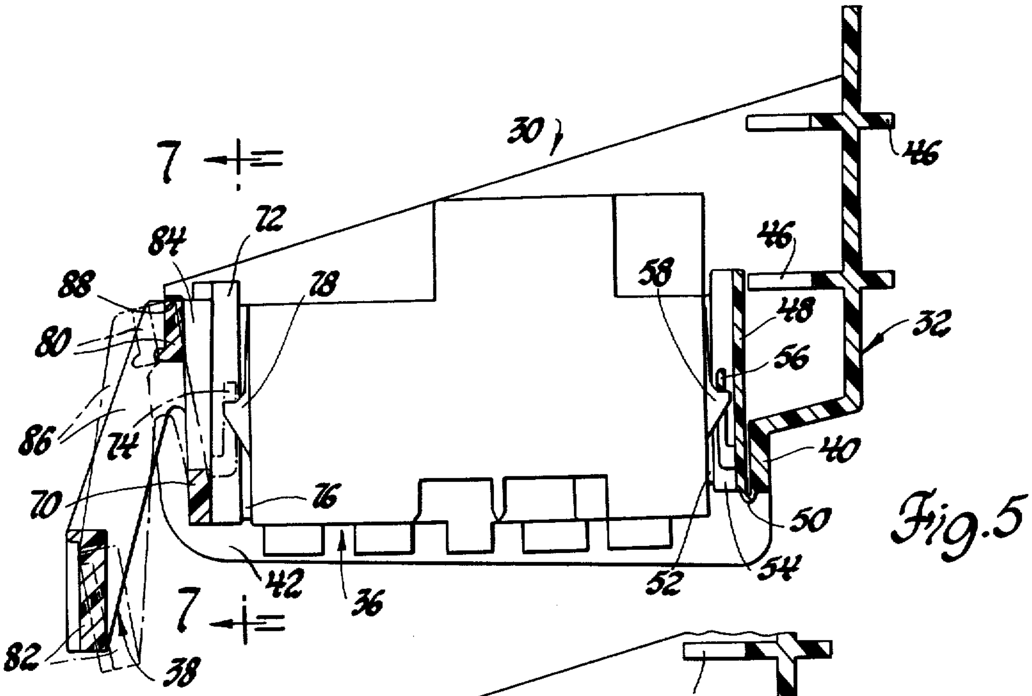
FIG. 5 is a section taken substantially along the line 5—5 of FIG. 3 and showing the fuse block in the stored position.
Figure 6:
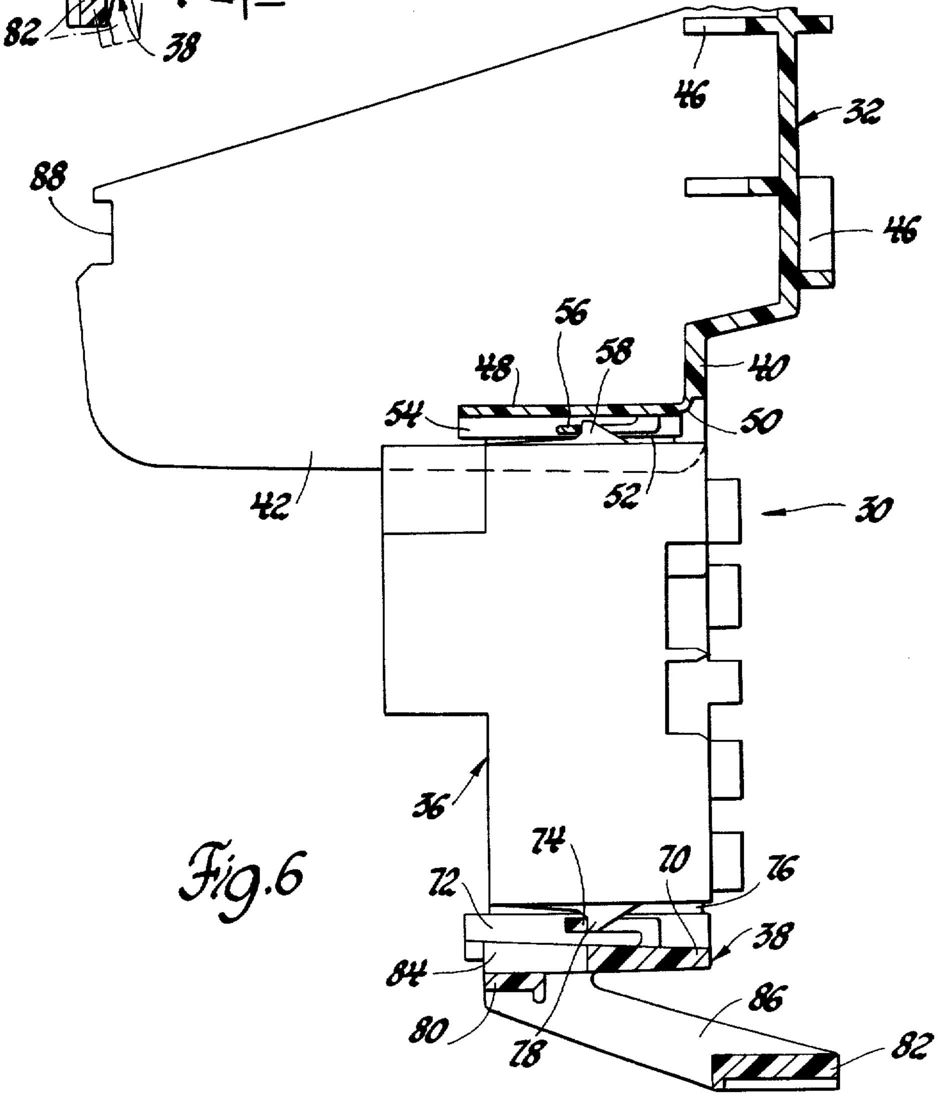
FIG. 6 is a view similar to FIG. 5 but it shows the fuse block in a pulled-down accessible position.
Figure 11:
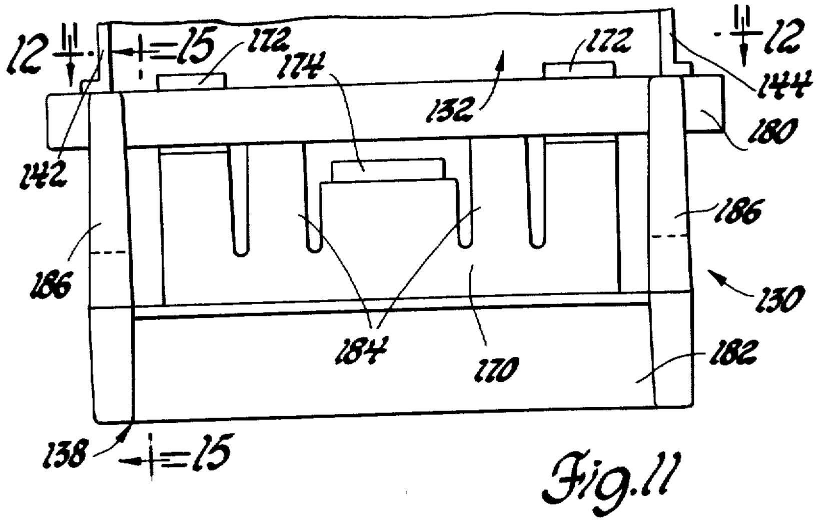
FIG. 11 is a rear view of a fuse block assembly having an alternate latch.
Figure 13:
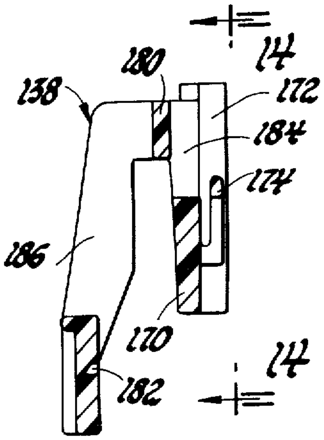
FIG. 13 is a section taken substantially along the line 13—13 of FIG. 12.
Figure 12:
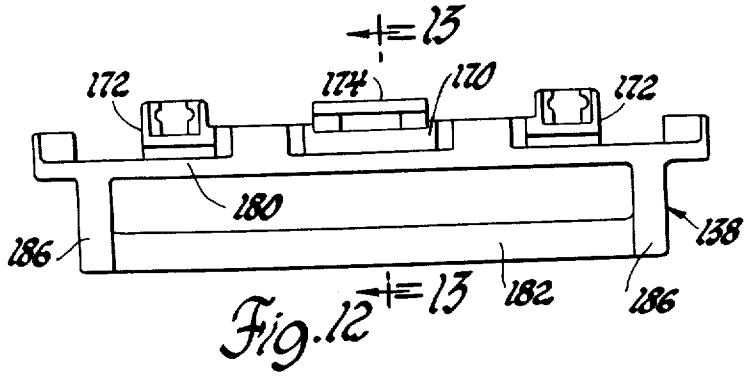
FIG. 12 is a view taken substantially along the line 12—12 of FIG. 11.

The lower front end of the bracket 32 is indented as shown in FIGS. 2, 5 and 6 to fit the particular contours of the instrument panel 20 with which the fuse block assembly 30 is illustrated.

The bracket 32 also includes a flap 48 which is integrally connected to the lower edge of the front wall 40 by an integral horizontal hinge 50. The hinge 50 permits the flap 48 and the attached fuse block 36 to move from the position shown in FIG. 5 where the fuse block 36 is stored horizontally within the bracket 32 to the position shown in FIG. 6 where the fuse block 36 hangs vertically beneath the bracket 32.

Figure 3:
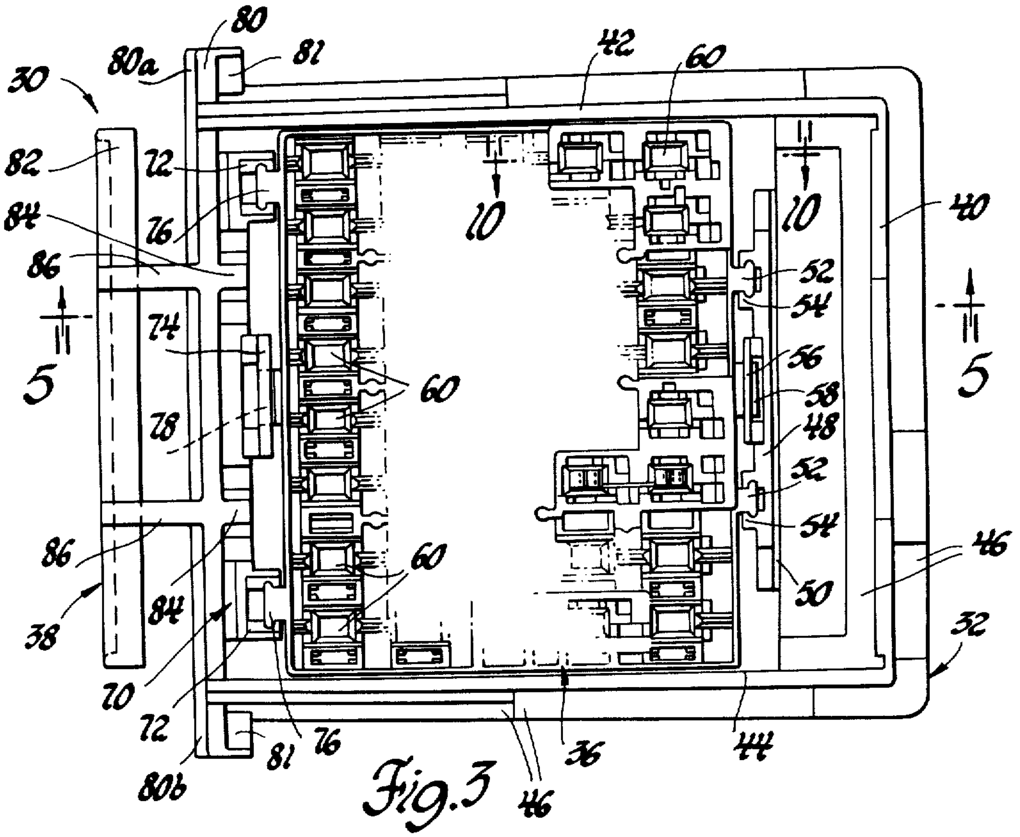
FIG. 3 is a top view of the fuse block assembly taken substantially along the line 3—3 of FIG. 2.
Figure 4:
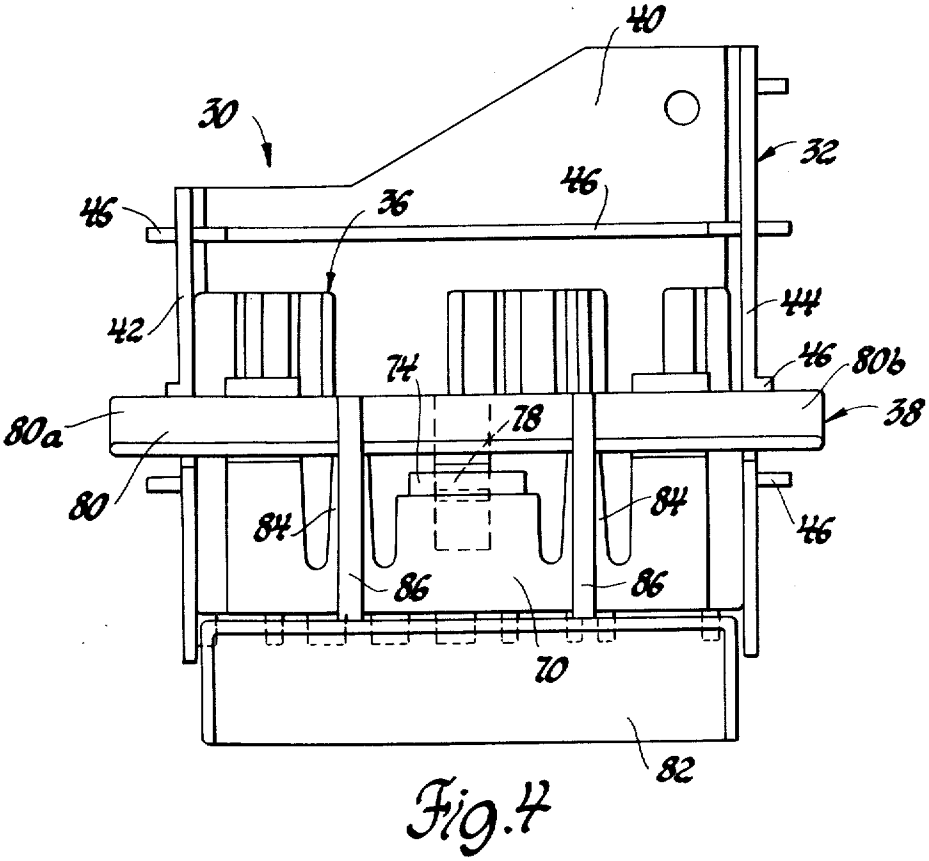
FIG. 4 is a rear view of the fuse block assembly taken substantially along the line 4—4 of FIG. 2.

The fuse block 36 is attached to the flap 48 by two T-shaped rails 52 on the top wall of the fuse block 36 which fit into a pair of ways 54 on the flap 48 as shown in FIGS. 3, 5 and 6. The ways 54 are closed at the hinged end of the flap 48 and the fuse block 36 is retained on the flap 48 by a latch arm 56 of the flap which engages a latch projection 58 of the fuse block.

The fuse block 36 is more or less typical of automotive fuse blocks in use today and, consequently, it need not be described in detail. Suffice it to say that the fuse block 36 has a number of terminal cavities 60 which extend through the fuse block 36 and which are generally arranged in rows and tiers as shown in FIG. 3. A wiring harness (not shown) comprising a number of conductor wires with terminals on the ends of each of the conductor wires leads to the fuse block 36 and the terminals are plugged into the cavities 60 through one end, in this case, the upper or rear ends which are shown in FIG. 3. Fuses, such as the fuses 62 shown in FIG. 1, are then plugged into adjacent pairs of terminals through the opposite or, in this case, front ends of the cavities. Sometimes other electric components, such as conductor leads from electrical accessories, are also plugged into the fuse block 36.

FIG. 10 illustrates special cavities and a special bus bar terminal 64 for accessory leads. The terminal 64, which is attached to a conductor wire 66 of the harness, is inserted into a double cavity which is deeper than normal by virtue of rearward extensions of the terminal block. The terminal 64 has three female contacts 68, 68*a* and 68*b*. Female contact 68 then used to connect a fuse in circuit with conductor wire 66 and another conductor wire via the terminal in the next cavity (not shown). The female contacts 68*a* and 68*b* then may be used to connect an electric accessory to the conductor wire 66. An advantage of having two female contacts 68*a* and 68*b* is that the accessory lead can be plugged into either the front or the rear of the fuse block 36.

The third major component of the fuse block assembly 30 is the latch 38 which is connected to the bottom of the fuse block 36 by an arrangement like that used to connect the fuse block 36 to the flap 48.

The latch 38 comprises a generally flat body 70 which has a projecting way 72 at each end and a medial latch arm 74. The ways 72 receive T-shaped rails 76 on the bottom wall of the fuse block 36 to connect the two pieces together. The pieces are retained in assembly by the latch arm 74 engaging the latch projection 78 of the fuse block 36.

The latch 38 further comprises a latch bar 80 and a handle 82 which operates the latch bar 80. The latch bar 80 is attached to the body 70 by two integral flex arms 84 which are attached to the body 70 at one end and to the latch bar 80 at the other end. The two flex arms 84 attach to the latch bar 80 about one-third of the way in from the respective ends of the latch bar 80.

The handle 82 is parallel to the latch bar 80 and connected to it by two rigid spars 86 which are aligned with the flex arms 84. The rigid spars 86 extend back toward the body ends of the flex arms 84 and beyond so that the flex arms 84 curl and the latch bar 80 moves away from the body 70 (to the left as shown in FIGS. 1 and 5) when the handle 82 is pulled toward the body 70. The opposite end portions 80*a* and 80*b* of the latch bar 80 are cantilevered out from the mid-portion of the latch bar 80 between the flex arm and spar connections and, consequently, the end portions 80*a* and 80*b* are also flexible in a direction transverse to the flex arms 84 and spars 86.

The latch 38 holds the fuse block 36 in the stored horizontal position shown in FIGS. 2, 3, 4 and 5 by the two ends of the latch arm 80 engaging in respective notches 88 in the rear edges of the side walls 42 and 44 of the bracket 32.

The fuse block 36 is pulled-down to the vertical access position shown in FIGS. 1 and 6 by the handle 82. Referring particularly to FIGS. 2 and 5, the operator first pulls the handle 82 forward horizontally, i.e., toward the right in the aforementioned Figures. This curls the flex arms 84 and moves the latch bar 80 rearwardly so that the ends disengage from the notches 88. After the latch bar 80 is released, the handle 82 is pulled forward and down in an arc which pivots the fuse block 36 about the hinge 50 to the vertical position shown in FIGS. 1 and 6.

To return the fuse block 36 to the stored position, the handle 82 is pushed rearwardly and up in an arc which pivots the fuse block from the vertical position shown in FIG. 6 to the stored horizontal position shown in FIG. 5. As the latch bar 80 approaches the notches 88, the opposite ends of the latch bar 80 engage the rear edges of the side walls 42 and 44 respectively. The end portions 80*a* and 80*b* are then curled outwardly until the latch bar 80 reaches the notches 88 and the ends snap-in to latch the fuse block 36 in the stored position.

The latch bar 80 has a triangular stop 81 at each end which is outward of the side walls 42 and 44. These stops help to guide the fuse block 36 into the space between the side walls 42 and 44.

FIGS. 11-16 show a fuse block assembly 130 having a modified latch 138 but which is otherwise the same. The latch 138 comprises a generally flat body 170 which includes a way 172 at each end and a medial latch arm 174 for attaching the latch 138 to the fuse block 136. The latch 138 further comprises a latch bar 180 and a handle 182 which operates the latch bar 180.

The latch bar 180 is attached to the body 170 by two integral flex arms 184 which are attached to the latch bar 180 about one-third of the way in from each end.

Figure 15:
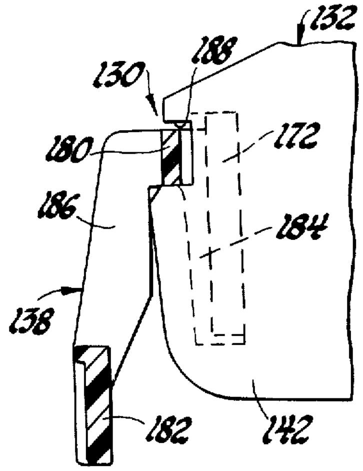
FIG. 15 is a section taken substantially along the line 15—15 of FIG. 11.
Figure 14:
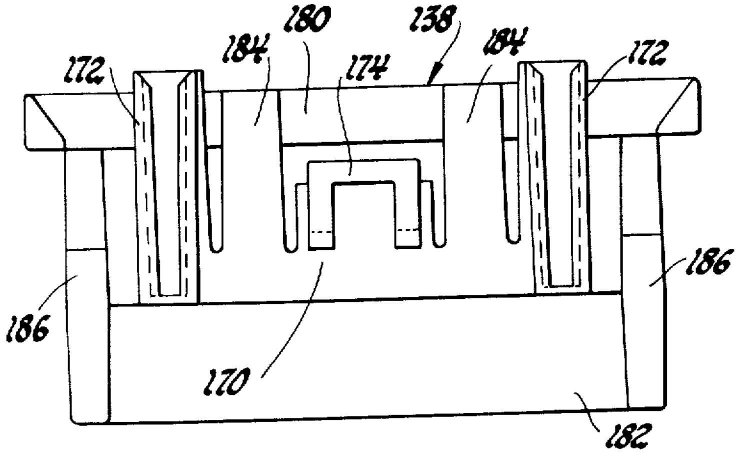
FIG. 14 is a section taken substantially along the line 14—14 of FIG. 13.
Figure 16:
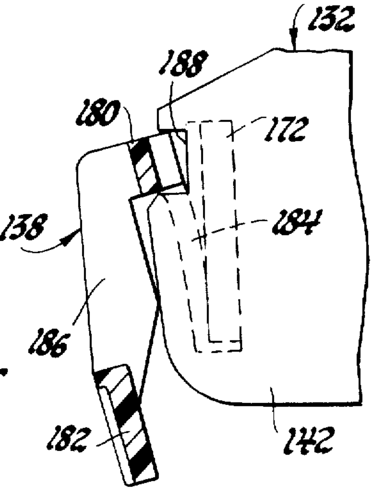
FIG. 16 is a view similar to FIG. 15 but showing the latch in a different operative position.

The handle 182 is parallel to the latch bar 180 and connected to it by two rigid spars 186 which are widely spaced apart so that they align with the respective rear edges of the side walls 142 and 144 of the bracket 132 as shown in FIGS. 15 and 16.

The latch 138 holds the fuse block 136 in a stored horizontal position by the opposite ends of the latch bar 180 engaging in the notches 188 in the respective rear edges of the side walls 142 and 144.

The fuse block 136 is pulled-down to the vertical access position shown in FIGS. 1 and 6 by the handle 138. Referring particularly to FIGS. 15 and 16, the operator first pulls the handle 182 forward horizontally, that is, toward the right as shown in FIGS. 15 and 16. This rocks the spars 186 on the rear edges of the side walls 142 and 144 which moves the latch bar 180 rearwardly against the bias of the flex arms 184 and disengages the latch bar ends from the notches 188. After the latch bar 180 is released, the handle 182 is pulled forward and down in an arc and the fuse block 136 pivots down to a vertical position.

To return the fuse block 136 to the stored position, the handle 182 is pushed rearwardly and upwardly in an arc. As the latch bar 180 approaches the notches 188, the ends engage the respective rear edges of the side walls 142 and 144 and the entire latch bar 180 is cammed outwardly bending the flex arms 184. When the ends of the latch bar 180 reach the notches 188, the entire latch bar 180 moves under the bias of the flex arms 184 snapping the ends into the notches 188.

I wish it to be understood that I do not desire to be limited to the exact details of construction shown and described, for obvious modifications will occur to a person skilled in the art.

The embodiments of the invention in which an exclusive property or privilege is claimed are defined as follows:

1. A fuse block assembly for an automotive vehicle having an instrument panel which projects toward the driver and has a generally vertical front wall, said fuse block assembly comprising;

a bracket having a front wall and spaced side walls, said bracket being adapted to be attached to the vehicle behind the front wall of the instrument panel in a generally horizontal position, a fuse block having one end hinged to the front wall of the bracket for movement about a horizontal axis between a generally horizontal position where the fuse block is stored between the side walls and a generally vertical position where the fuse block hangs below the instrument panel for easy access to replace the fuses and the like carried thereby, and a manually releasable latch comprising a latch member for holding the fuse block in the stored position and a handle for operating the latch member, said latch member being attached at the opposite end of the fuse block by a flex arm and engaging the bracket to hold the fuse block in the stored position, and said handle being attached to the latch member by a rigid spar whereby the latch member moves away from the fuse block to release the latch member from the bracket and permit the fuse block to move to a generally vertical position.

2. A fuse block assembly for an automotive vehicle having an instrument panel which projects toward the driver and has a generally vertical front wall, said fuse block assembly comprising;

a bracket having a front wall and spaced side walls, said bracket being adapted to be attached to the vehicle behind the front wall of the instrument panel in a generally horizontal position, a fuse block having one end hinged to a lower edge of the front wall of the bracket for movement about a horizontal axis, between a generally horizontal position where the fuse block is stored between the side walls and a generally vertical position where the fuse block hangs below the instrument panel for easy access to replace the fuses and the like carried thereby, and a manually releasable latch comprising a latch bar for holding the fuse block in the stored position and a handle for operating the latch bar, said latch bar being attached at the opposite end of the fuse block by flex arms and having opposite ends which engage rear edge notches in the respective side walls of the bracket to hold the fuse block in the generally horizontal position between the side walls, and said handle being attached to the latch bar by rigid spars whereby the latch bar moves away from the fuse block responsive to movement of the handle toward the fuse block to release the ends of the latch bar from the notches and permit the fuse block to move to a generally vertical position.

3. A fuse block assembly for an automotive vehicle having an instrument panel which projects toward the driver and has a generally vertical front wall, said fuse block assembly comprising;

a U-shaped bracket having a front wall and spaced side walls, said bracket being adapted to be attached to the vehicle behind the front wall of the instrument panel in a generally horizontal position, a fuse block having one end connected to a flap integrally hinged to a lower edge of the front wall of the bracket whereby the fuse block pivots about a horizontal axis, between a generally horizontal position where the fuse block is stored between the side walls of the bracket and a generally vertical position where the fuse block hangs below the instrument panel for easy access to replace the fuses and the like carried thereby, and a manually releasable latch comprising a generally flat body attached at the opposite end of the fuse block, a latch bar for holding the fuse block in the stored position and a handle spaced from and parallel to the latch bar for operating the latch bar, said latch bar being attached to the generally flat body by a pair of coplanar flex arms of the generally flat body and having opposite ends which engage rear edge notches in the respective side walls of the bracket to hold the fuse block in the generally horizontal position between the side walls, and said handle being attached to the latch bar by a pair of rigid spars whereby the latch bar moves away from the fuse block responsive to movement of the handle toward the fuse block to release the ends of the latch bar from the notches and permit the fuse block to pivot to the generally vertical position.

4. The fuse block assembly as defined in claim 3 wherein the pair of flex arms are connected to the lock bar about one-third of the way in from the respective ends of the lock bar and wherein the pair of rigid spars are aligned with the pair of flex arms whereby the end portions of the latch bar are flexible in a direction transverse to the flex arms.

5. The fuse block assembly as defined in claim 3 wherein the pair of rigid spars engage the respective rear edge of the bracket side walls when the fuse block is in the horizontal position and rock on such edge to pivot the lock bar out of the rear edge notches when the handle is moved toward the fuse block.

* * * * *